G. L. DONOVAN.
Furniture-Caster.
No. 217,349. Patented July 8, 1879.
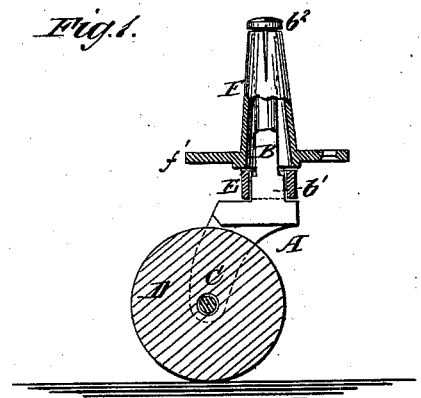
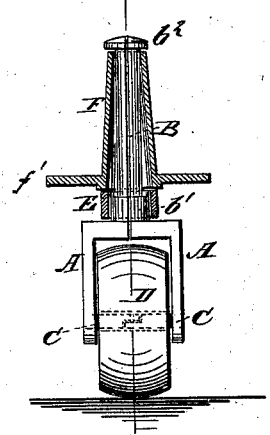
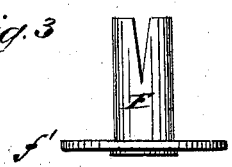
WITNESSES:
INVENTOR:
BY
ATTORNEYS.

UNITED STATES PATENT OFFICE.

GEORGE L. DONOVAN, OF WEST MERIDEN, CONNECTICUT, ASSIGNOR TO SELAH A. HULL, OF SAME PLACE.

IMPROVEMENT IN FURNITURE-CASTERS.

Specification forming part of Letters Patent No. 217,349, dated July 8, 1879; application filed November 25, 1878.

*To all whom it may concern:*

Be it known that I, GEORGE L. DONOVAN, of West Meriden, in the county of New Haven and State of Connecticut, have invented a new and useful Improvement in Casters, of which the following is a specification.

Figure 1 is a side view of one of my improved casters, partly in section, to show the construction. Fig. 2 is a front view of the same, partly in section, to show the construction. Fig. 3 is a detail side view of the socket or shell.

Similar letters of reference indicate corresponding parts.

The object of this invention is to furnish an improved caster for furniture and other uses which shall be simple in construction and inexpensive in manufacture, and at the same time convenient and durable in use.

The invention consists in a caster in which the frame is made in two parts, the plane of division passing longitudinally through the pivot or stem and transversely across the middle part of the journal.

The frame of the caster is made in two parts, the plane of division running midway between the arms A, and longitudinally through the pivot or stem B, and crossing the journal C at right angles.

The ends of the parts of the journal C are formed solid with the arms A, and abut against each other in the center of the wheel D, and may be halved to each other, if desired.

The neck of the pivot B of the frame has a shoulder, $b^1$, formed upon it, to give it strength at the point where it is subjected to the most strain.

The two parts of the frame are fastened together and to the wheel D by a ring-collar, E, slipped upon the base or neck of the pivot B, and made a little wider than the height of the shoulder $b^1$, so that the socket or shell F may rest upon it and not upon the shoulder $b^1$, so as always to keep the parts of the caster-frame close together in case of wearing. Upon the upper end of the pivot or stem B is formed a head, $b^2$, as shown in Figs. 1 and 2.

The socket or shell F is made tubular in form, and of such a size as to be slipped down over the head $b^2$, and of such a length as to fit in between the head $b^2$ and the collar E.

The socket or shell is slitted in its opposite sides from its upper end for a third or half its length, as shown in Fig. 3, so that its upper end may be closed down beneath the head $b^2$, to prevent the pivot B from being drawn out of the said socket. This construction of the upper part of the socket F gives it a slightly-tapering form, and causes it to fit more snugly into the hole in the furniture.

Around the lower end of the socket F is formed a flange, $f'$, having holes formed through it to receive the screws by which it is secured in place.

I am aware that it is not new to use a two-part pivot with the free ends of the two parts simply abutted together; but

What I claim is—

1. A caster in which the frame is made in two parts, the plane of division passing longitudinally through the pivot or stem B, and transversely across the middle part of the journal C, as shown and described.

2. The equally-divided caster-journal C, having the halves correspondingly rabbeted at the ends, one attached to the inner side of each of the arms A A, as shown and described.

GEORGE L. DONOVAN.

Witnesses:
CHARLES H. SHAW,
A. B. MATHER.